US007191322B2

(12) United States Patent
Millward et al.

(10) Patent No.: US 7,191,322 B2
(45) Date of Patent: Mar. 13, 2007

(54) METHOD AND APPARATUS FOR TUNING MULTIPLE INSTANCES OF KERNEL MODULES

(75) Inventors: Scott T. Millward, Roseville, CA (US); Steven T. Roth, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 09/977,126

(22) Filed: Oct. 12, 2001

(65) Prior Publication Data
US 2004/0003221 A1  Jan. 1, 2004

(51) Int. Cl.
*G06F 9/00* (2006.01)
*G06F 9/44* (2006.01)
(52) U.S. Cl. ............................... 713/1; 713/2; 717/108
(58) Field of Classification Search ............ 713/1, 713/100, 2; 717/165, 157, 108; 707/206; 719/321; 718/109
See application file for complete search history.

(56) References Cited

U.S. PATENT DOCUMENTS

| 6,075,939 | A | * | 6/2000 | Bunnell et al. | 717/107 |
| 6,112,301 | A | * | 8/2000 | Johnson | 713/1 |
| 6,148,346 | A | * | 11/2000 | Hanson | 719/321 |
| 6,182,089 | B1 | * | 1/2001 | Ganapathy et al. | 707/206 |
| 6,272,519 | B1 | * | 8/2001 | Shearer et al. | 718/104 |
| 6,327,703 | B1 | * | 12/2001 | O'Donnell et al. | 717/162 |
| 6,665,865 | B1 | * | 12/2003 | Ruf | 717/157 |

OTHER PUBLICATIONS

Shalit et al, The Dylan Reference manual, Apr. 7, 1998, pp. 7.*
IBM, Management of Instance Lists in an Object Oriented System, Nov. 1, 1994, vol. 37, Issue 11, pp. 3.*
Yaseen et al, An Extensible Kernel Object Management System, 1991, Conference on Object Oriented Programming Systems Languages and Application (Phoenix, Arizona, United States), pp. 247-262.*
Oikawa et al, Adaptive Object Management for a Reconfigurable Microkernel, 1996, IEEE, pp. 67-71.*

* cited by examiner

*Primary Examiner*—Thomas Lee
*Assistant Examiner*—Sureh K Suryawanshi

(57) ABSTRACT

In one configuration, a method for operating a computer includes booting an operating system having a plurality of tunable kernel subsystems; storing a representation of at least one base tunable having a set of inheritable properties in a memory of the computer; and storing, in a memory of the computer, a plurality of representations of instances of at least one of the stored base tunables, each instance including at least one inheritable property of the stored base tunable, wherein representations of at least a first instance and a second instance are stored at different memory addresses. The first instance and the second instance include a plurality of values, and differ in at least one corresponding value.

20 Claims, 4 Drawing Sheets

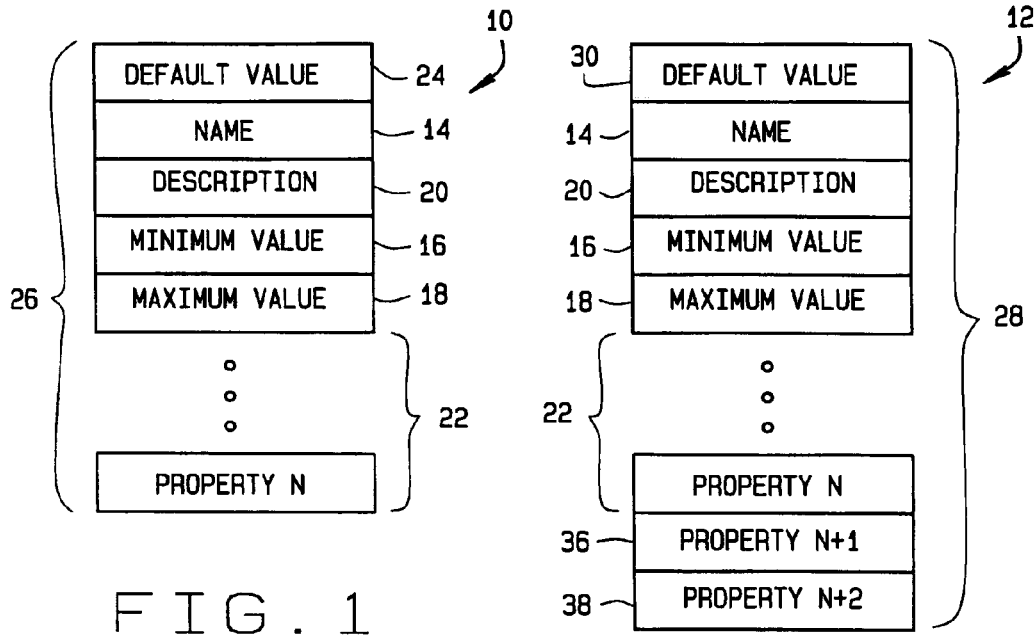
FIG. 1
FIG. 2
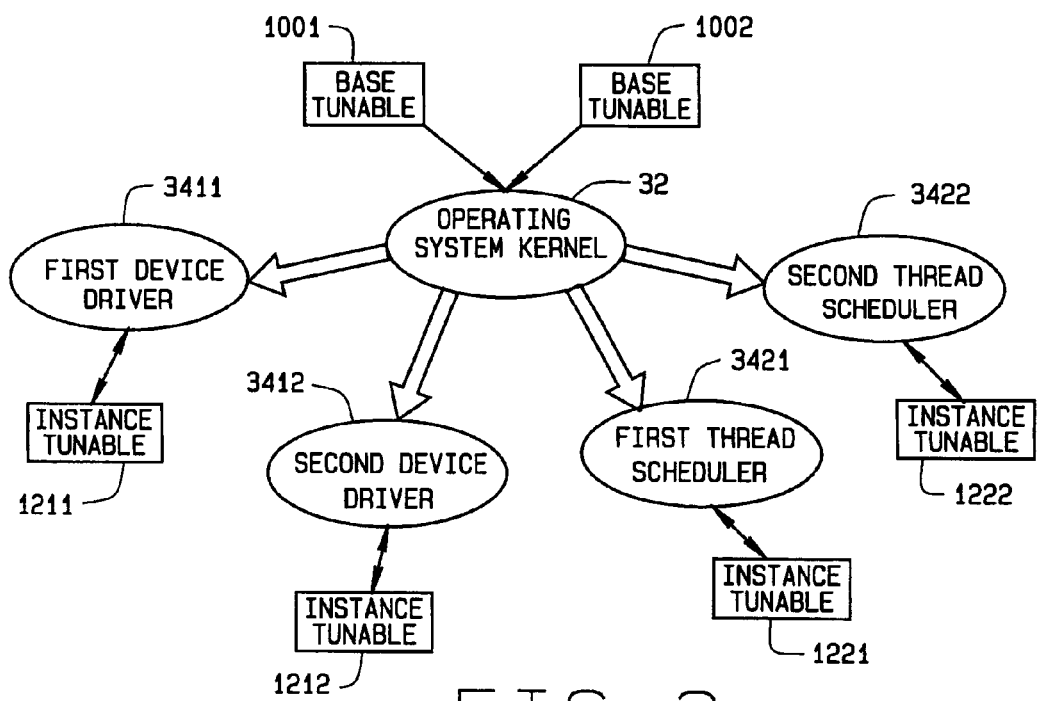
FIG. 3

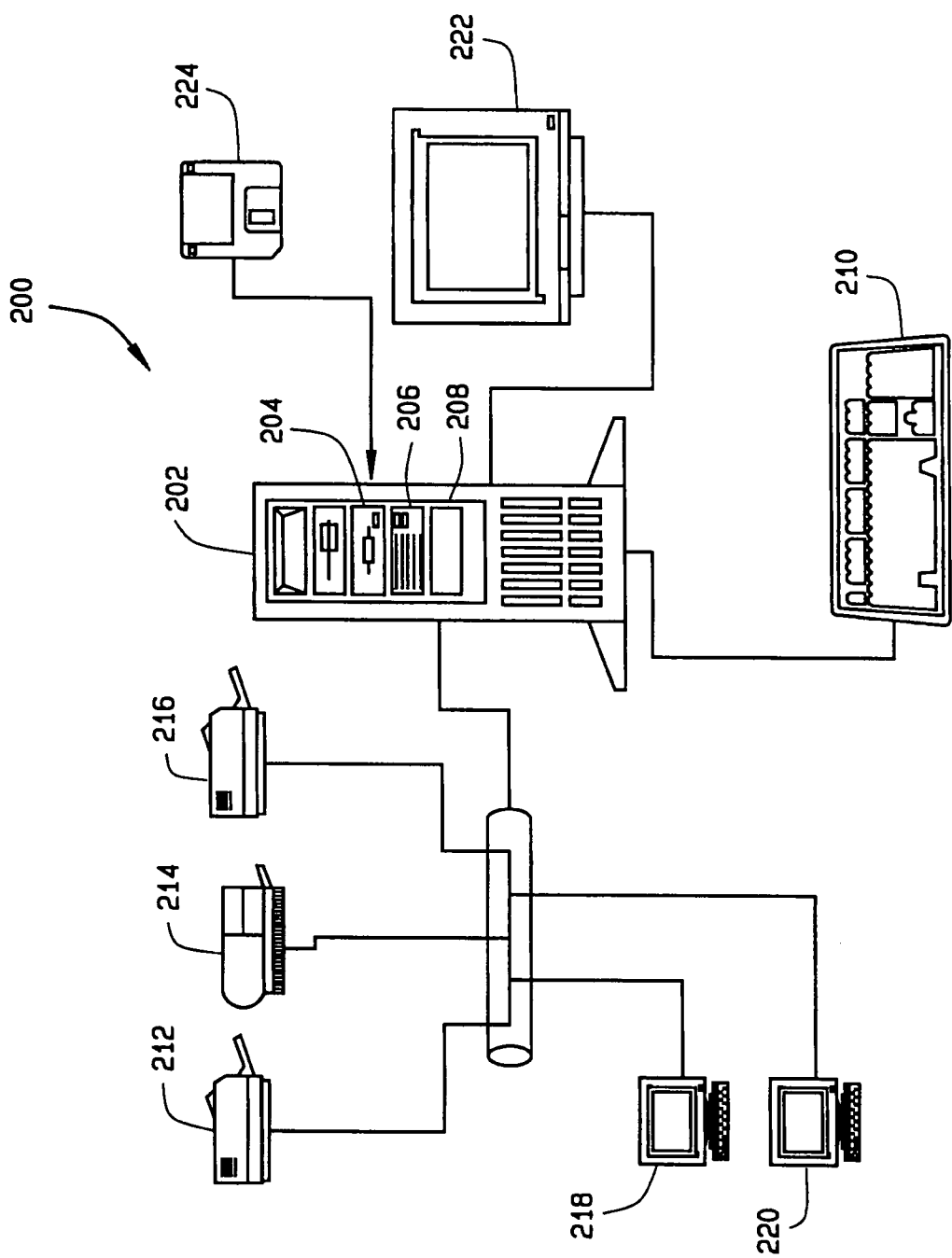

METHOD AND APPARATUS FOR TUNING MULTIPLE INSTANCES OF KERNEL MODULES

FIELD OF THE INVENTION

The present invention relates to methods and apparatus for operating a computer and more specifically to methods and apparatus for managing the manner in which an operating system and its modules are tuned to improve computing performance.

BACKGROUND OF THE INVENTION

"Tunable variables" (sometimes also referred to as "tunable parameters," "kernel configurable parameters," or simply "tunables") are variables that affect the operation of an entire operating system kernel by setting table sizes and system thresholds, among other things. Tunable parameters also control characteristics of processes, files, and system activity, and thus provide a way in which operating system kernels can be optimized for particular computers or installation or usage circumstances. For example, a "maxusers" tunable parameter may be provided to adjust the size of tables, arrays, buffers, etc. to optimize system performance for the expected number of users on a system. System administrators will be familiar with the tunable parameters that optimize their operating system kernels to various computer systems, installation, and/or usage circumstances. In some instances, kernels are recompiled and relinked for tuning, and to add drivers and subsystems.

Sometimes, it would be useful to have a portion of a kernel use different tunable values for different tasks. For example, a device driver may have tunables that govern its operation. A system administrator may wish to use different values of those tunables for different devices controlled by that driver. Also, a thread scheduler may have tunables that govern scheduling priorities. A system administrator may want to use different values of these tunables for the threads of different users. However, known operating systems do not provide this capability within a standard kernel turning framework.

SUMMARY OF THE INVENTION

There is therefore provided, in one configuration of the present invention, a method for operating a computer. The method includes booting an operating system having a plurality of tunable kernel subsystems; storing a representation of at least one base tunable having a set of inheritable properties in a memory of the computer; and storing, in a memory of the computer, a plurality of representations of instances of at least one of the stored base tunables, each instance including at least one inheritable property of the stored base tunable, wherein representations of at least a first instance and a second instance are stored at different memory addresses. The first instance and the second instance include a plurality of values, and differ in at least one corresponding value.

Another configuration provides a computing apparatus including a central processing unit, a memory coupled to the central processing unit, and a memory storage device coupled to the central processing unit and upon which an operating system kernel and kernel subsystems are stored. The computing apparatus is configured to boot an operating system having a plurality of tunable kernel subsystems; store a representation of at least one base tunable having inheritable properties in the memory of the computing apparatus; and store, in the memory of the computing apparatus, a plurality of representations of instances of at least one stored base tunable, each instance including at least one inheritable property of the stored base tunable, wherein representations of at least a first instance and a second instance are stored at different addresses in the memory. The first instance and the second instance include a plurality of values, and differ in at least one corresponding value.

In yet another configuration, a machine-readable medium or media is provided for a computing apparatus having a central processing unit and associated memory. The data includes instructions for the computing apparatus to store a representation of at least one base tunable having inheritable properties in the memory of the computing apparatus, and store, in the memory of the computing apparatus, a plurality of representations of instances of at least one stored base tunable, each instance including at least one inheritable property of the stored base tunable, wherein representations of at least a first instance and a second instance are stored at different addresses in the memory. The first instance and the second instance include a plurality of values, and differ in at least one corresponding value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a representation of one configuration of a base tunable data structure.

FIG. 2 is a representation of one configuration of an instance variable data structure.

FIG. 3 is a representation of one configuration of an operating system including a kernel, device drivers, thread schedulers, base tunables, and instance tunables.

FIG. 6 is a representation of a configuration of a computing system suitable for performing the processes described herein.

Figure 4:
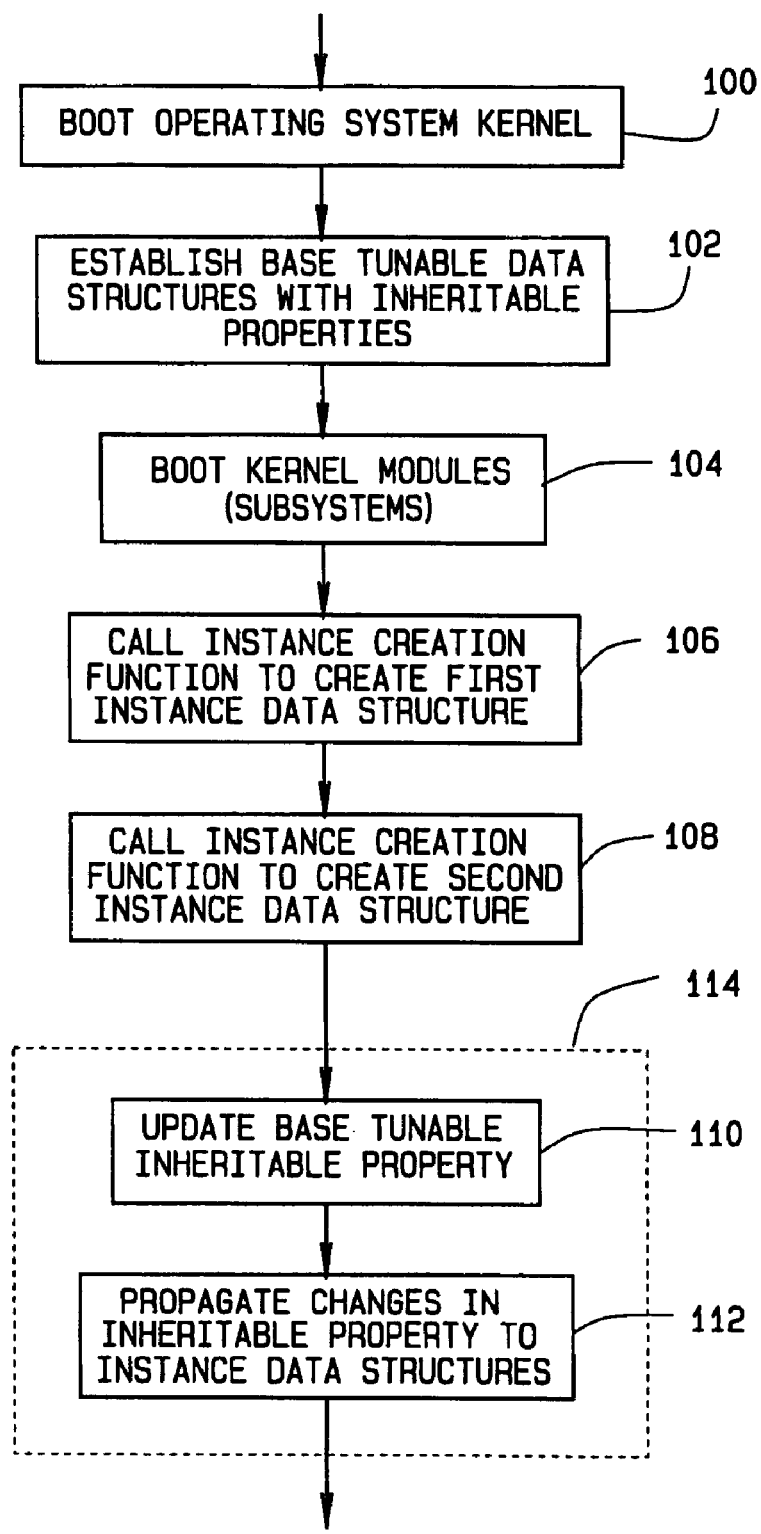
FIG. 4 is a simplified flow chart showing one configuration of a method for booting an operating system kernel, establishing base tunables, and establishing and using instance tunables.

The flow charts included herein do not necessarily represent a single thread of execution in a single computer process, but rather, in some instances, may rather a sequence of coordinated steps, events, or processes occurring in a plurality of threads. In addition, the flow charts herein should not be interpreted as implying that no other events, steps or processes can occur between those explicitly represented in the drawings.

DETAILED DESCRIPTION OF THE PREFERRED EMBODIMENTS

The following description of the preferred embodiment(s) is merely exemplary in nature and is in no way intended to limit the invention, its application, or uses. As used herein, "at least one of A or B" encompasses configurations comprising either A or B, and configurations comprising both A and B. Also as used herein, a function "call" is not intended to be limited to any one particular method of function invocation. In addition, a "memory" of a computing apparatus may comprise any appropriate type of primary or secondary storage, unless the type of memory is further specified. Examples of primary storage include cache memory, random access memory, and read only memory. Examples of secondary storage include hard disks, floppy diskettes, CD-ROMs and CD-RW. One skilled in the art would take into account whether a memory must be writable or need only be readable to determine whether a particular type of primary or second storage would be appropriate for a given use.

In one configuration and referring to FIG. 1 and FIG. 2, an operating system is provided with "base tunables" 10 and "instance tunables" 12 Instance tunables 12 are tunable variables that inherit names 14, allowed values 16, 18, descriptions 20, and other properties 22 from base tunables. "Base tunables" 10 are tunable variables that provide inheritable properties 14, 16, 18, 20, and 22 and default values 24 for instance tunables 12. Each base tunable 10 and each instance tunable 12 is represented in a computer by a corresponding data structure 26, 28 in a different portion of a memory of the computer. Because of their relationship to base tunables 10, instance tunables 12 are also referred to herein as "instances" of their associated base tunables 10. For simplicity, only configurations having a small number of base tunables 10 and instance tunables 12 are discussed herein, but no limitation in the number of base tunables 10 or instance tunables 12 derived from each base tunable is imposed by the invention. In the terms "base tunable" and "instance tunable," the term "tunable" itself may be considered as shorthand for "tunable parameter" or "tunable variable," where the "parameter" or "variable" has been generalized to a data structure. In one configuration, instance values 30 of each instance 12 of a base tunable 10 need not be the same as default values 24, nor need they be the same for each instance 12. Different base tunables 10 and their associated instance variables 12 may have different properties than those represented in FIGS. 1 and 2. However, each instance tunable 12 will include at set of one or more inheritable properties of the associated base tunable 10. In one configuration, the set includes at least one member of the group consisting of a name of the base tunable, one or more values indicative of allowed instance values, a description, and combinations thereof.

Referring to FIG. 3, each base tunable 1001, 1002 may have derived from it any number of instance tunables 1211, 1212, 1221, 1222 for the different tasks, devices, or users involved. It is not required that every base tunable 1001, 1002 have a derived instance tunable. Instance tunables 1211, 1212, 1221, 1222 can each have their own instance values or can be set to inherit their instance values from their base tunables. For example, memory for base tunables 1001 and 1002 is allocated and parameter values are initialized by operating system kernel 32 when kernel 32 is booted. A kernel module, such as first device driver 3411, then instantiates instance tunable 1211 from base tunable 1001 when the kernel module is loaded. (By "instantiating an instance tunable," it is meant that memory is allocated for a data structure 28 of an instance tunable 12, and its properties initialized utilizing default values from its associated base variable 10 and/or any values overriding the default values.) Similarly, another kernel module, such as second device driver 3412, instantiates another instance tunable 1212, in this case, a second instance of base tunable 1001. In one configuration, other kernel modules also instantiate other instance tunables. For example, first thread scheduler 3421 instantiates instance tunable 1221 and second thread scheduler 3422 instantiates instance tunable 1222. Instant tunable 1221 and instance tunable 1222 are instances of a second base tunable 1002 in this example.

It should be understood that both the types and numbers of kernel modules will vary depending upon the operating system and/or computer configuration, and that the number of base tunables 10 and instance tunables 12 will also vary. Moreover, configurations of the invention are not limited to those in which a kernel module instantiates only one instance tunable. Therefore, unless explicitly stated in the examples presented herein or in the claims, any number of base tunables, instance tunables, and/or kernel modules may be present beyond those actually recited.

In one configuration, support for base tunables 10 and instance tunables 12 are added to an infrastructure having only ordinary tunables. An instance creation function is provided that is callable by kernel modules (also referred to as subsystems) such as first device driver 3411 to create an instance tunable 1211 derived from a selected base tunable 1001. A propagation function is provided to propagate changed values of a base tunable 1001 (for example, a changed minimum value 16) to all of the instance tunables 1211, 1212 that inherit values from selected base tunable 1001. A deallocation function is provided to remove an instance tunable (e.g., 1211) when it is no longer needed.

The instance creation function creates an instance tunable 12 in a manner similar to that in which host operating system kernel 32 creates any other tunable, in that space for a data structure is allocated in memory. However, metadata (i.e., properties 14, 16, 18, 20, 22, 24) for instance tunable 12 is copied from a specified base tunable 10. In addition to ordinary tunable creation steps, the instance creation function creates a data structure 28 that includes identification 14 of the associated base tunable. Also, the system sets up a call to a propagation function that is called any time a base tunable 10 value (i.e., any property 14, 16, 18, 20, 22, 24) is changed.

The propagation function is called for each instance tunable 12 whenever an associated base tunable 10 property is changed. The propagation function determines whether instance tunable 12 is intended to inherit the changed property from base tunable 10, and if so, the propagation function changes the property of instance tunable 12 to match. For example, properties such as 36, 38 are provided in each data structure 28 of an instance variable 12 to specify which properties (e.g., properties 14, 16, 18, 20, and/or 24) are to be inherited for any given instance variable 12. In another configuration, properties such as 36 and 38 are included in inheritable properties 22 rather than added as additional properties in data structure 12.

The deallocation function removes an instance tunable 12 in a manner similar to that in which host operating system kernel 32 removes other tunables, i.e., the memory used for an instance tunable 12 is freed. The deallocation function also ensures that the propagation function is no longer called, for that instance, when a corresponding base tunable 10 value (e.g., properties 14, 16, 18, 20, 22, or 24) is changed.

Figure 5:
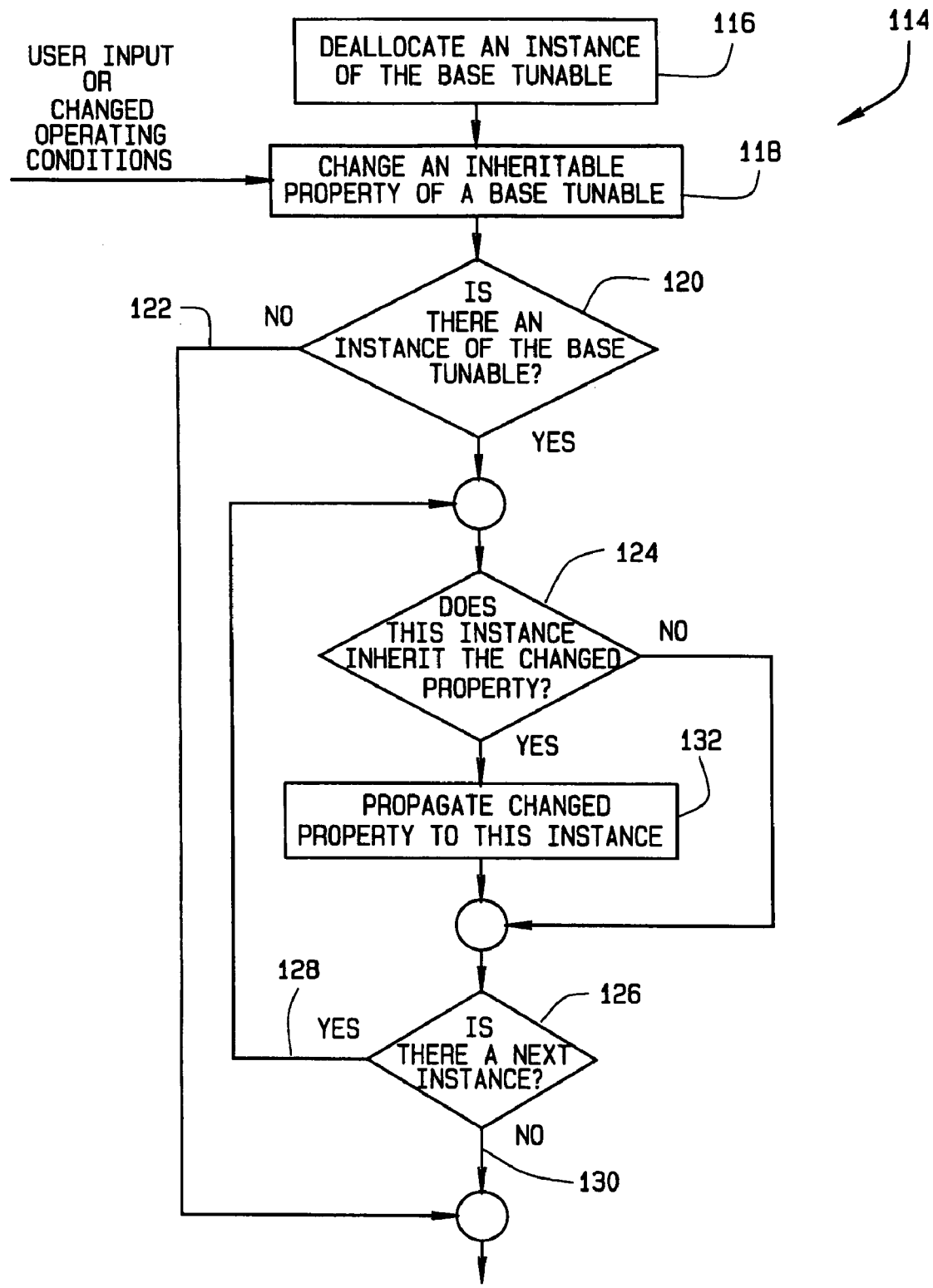
FIG. 5 is a more detailed representation of one configuration of a process to update a base tunable property and propagate the update to instance variables.

FIGS. 4 and 5 are simplified flow charts of examples in which the first, second, and third functions described above are utilized. Referring first to FIG. 4, an operating system kernel is booted 100. The booted kernel module establishes 102 base tunable data structures with inheritable properties by storing a representation of the base tunable in a memory of the computer. The kernel then boots 104 one or more kernel modules (also referred to as "subsystems"). At least one of the modules or subsystems then calls 106 an instance creation function to create a first instance data structure, for example, instance tunable 1211 of FIG. 3. This call may be made more than once for each module, depending upon the module or subsystem making the call and the number and type of instance tunables that it utilizes. At least a second module also calls 108 the instance creation function to create a second instance data structure, for example, instance tunable 1212 of FIG. 3.

The first instance data structure and the second instance data structure correspond to a first instance variable and a second instance variable, respectively, and are allocated at different memory addresses of the computer. The instance creation function, in addition to creating the instance data structures. In one configuration, the instance creation function copies properties from the associated base tunable to the new instance tunable, except for values explicitly supplied as arguments to the instance creation function. However, in one configuration, the two instance tunables each inherit at least one inheritable property from the base tunable, and differ from one another in having at least one property value that differs between instances. The different property values, for example, are supplied as different arguments to the two instance creation function calls 106, 108. Property values may also be changed at a later time by an administrator in some cases, and/or by the operating system itself in response to changing conditions. Some property values may remain constant for as long the instance tunable is allocated. For example, in one configuration, a value indicative of the identity of the base tunable (for example, a name or a pointer to the base tunable) is written into both the first instance data structure and the second instance data structure by the instance creation function. This value may remain constant throughout the lifetime of the first and second instance data structures.

In one configuration, a subsequent event results in a base tunable inheritable property being updated 110. Examples of such events are operating system calls from a program run by an administrator or adjustments made by the kernel in response to changing conditions. Update 110 causes the propagation function to be called to propagate 112 the changes in the inheritable property to instance data structures. For example, if a "minimumBufferSize" property of a "bufferSize" base tunable is changed, the minimumBufferSize property value is propagated to all allocated instance variables that have inherited this property. In one configuration, the kernel determines when a change to an inheritable property occurs (for instance, by requiring all changed to be made by function calls), and propagates the changed property to the first instance data structure and the second instance data structure by copying the value of the changed parameter into each structure.

In another situation, at least one tunable variable is deallocated. For example, either the first instance of the base tunable or the second instance of the base tunable is deallocated. In this situation, in place of steps inside box 114 in FIG. 4, the steps shown in FIG. 5 are executed. First, one of the instances of the base tunable is deallocated 116. This deallocation frees the memory used by the data structure of the deallocated instance tunable and removes it from a list of variables that are to be checked for updates in the event of a change in an inheritable parameter of the corresponding base tunable. Thus, when a change in such an inheritable property does occur 118, the kernel first determines 120 whether there are any instances of the base tunable, i.e., whether there are any instance tunables that have not been deallocated. In one embodiment, determination 120 is done indirectly by calling propagation functions, if any. (There is one propagation function per instance, and each is called.) If there are no instances 122 of the base tunable, there is nothing to do. Otherwise, the kernel determines 124 whether the first instance variable being checked inherits the changed base property. This check may be performed, for example, by examining properties in the data structure of the instance tunable under consideration that specify which properties are to be inherited. If the first instance variable does not inherit the changed property, the kernel determines 126 whether there are other instances of this base variable to check that have not been deallocated. If not 130, there is nothing else to do. Otherwise 128, the next instance is checked. Thus, each instance of the base variable is checked, and if an instance inherits the changed property 124, the changed property is propagated 132 to the instance variable, and a check is performed 126 to determine whether there are other instances of the base variable. In this manner, determination 124 is performed only for instance variables that are not deallocated.

In one embodiment, there are no propagation functions. Instead, each instance data structure contains a pointer to its base tunable and an indication of whether the instance is to inherit its value from the base tunable. Any time a value of an instance is needed, the instance is checked to determine whether the instance is supposed to be inheriting from its base tunable, and if so, the value of the base tunable is retrieved using the pointer contained in the instance data structure.

An example of a computing apparatus 200 configured to operate in accordance with the above description is represented in FIG. 6. Cabinet 202 houses a central processing unit (CPU) and associated random access memory (neither of which are shown separately in FIG. 6). In addition to random access memory, the CPU also communicates with other memory storage devices, for example, floppy disk drive 204, hard disk drive 206, and CD-ROM drive 208. In one configuration, the operating system is stored on hard disk drive 206 (or more generally, on one or more memory storage devices or media) and booted by the CPU when power is applied to computer system 200, when a switch is thrown on cabinet 202, when a command is issued from keyboard 210, or at other times in response to software or firmware instructions. Computer system 200 in one configuration comprises a plurality of similar devices such as printers 212, 214, and 216 that use separate device drivers that have separate instance variables to control their use. In addition, the operating system kernel in one configuration supports multiple users at terminals 218, 220, and 222. To control the multiple processes and process threads, multiple thread schedulers and instance variables are used. In one configuration, machine readable data configured to control computing apparatus 200 to execute the steps and procedures described herein are recorded on one or more media 224, for example, one or more floppy diskettes or CD-ROMS.

It will thus be recognized that configurations of the present invention provide the increased flexibility for system administrators. For example, in one configuration, different values of tunables for different devices controlled by different instances of the same driver can be used. Also, schedulers can be set up with different values for scheduling priorities for different users, processes, or threads. Configurations of the invention are also useful in any computing method or apparatus in which different values of tunables are required for different instances of the same or similar instruction code.

The description of the invention is merely exemplary in nature and, thus, variations that do not depart from the gist of the invention are intended to be within the scope of the invention. Such variations are not to be regarded as a departure from the spirit and scope of the invention. Also, otherwise explicitly qualified (such as by reciting "only one" element or "no more than two" elements), claims that recite "one," "at least one," "one of," "a," or "an" element, or any specific number of elements are not intended to exclude embodiments having a greater number of elements than those recited. Also, the invention imposes no restriction on the number of base tunables and the number of instances derived from each. Unless specifically qualified as described above, recitation of one or any other number of base tunables and/or instances in a claim is not intended to exclude from the scope of a claim configurations having additional base tunables and/or instances, even if the additional base tunables and/or instances have properties different from those of the one or a few base lunables and/or instances recited in the claim.

What is claimed is:

1. A method for operating a computer comprising:
    booting an operating system having a plurality of tunable kernel subsystems;
    storing a representation of at least one base tunable having a set of inheritable properties in a memory of the computer; and
    storing, in a memory of the computer, a plurality of representations of instances of at least one of the stored base tunables, each instance including at least one inheritable property of the stored base tunable, wherein representations of at least a first instance and a second instance are stored at different memory addresses, the first instance and the second instance comprise structures including a plurality of values, and the first instance and the second instance differ in at least one corresponding said value.

2. A method in accordance with claim 1 wherein said storing a plurality of representations of instances of at least one of the stored base tunables comprises:
    from a first kernel subsystem, calling an instance creation function to store a first instance data structure in a memory of the computer corresponding to a first instance of one of the base tunables and including at least one said inheritable property; and
    from a second, different kernel subsystem, calling the instance creation function to store a second instance data structure in a memory of the computer corresponding to a second instance of said one of the base tunables and including at least one said inheritable property.

3. A method in accordance with claims 2 further comprising deallocating at least one of the first instance of the base tunable and the second instance of the base tunable.

4. A method in accordance with claim 2 further comprising writing data indicative of the identity of said one of the base tunables into said first instance data structure and said second instance data structure.

5. A method in accordance with claim 2 further comprising determining when an inheritable property in a base tunable data structure is changed, and propagating the changed inheritable property to both the first instance data structure and the second instance data structure upon said determination.

6. A method in accordance with claim 2 further comprising determining when an inheritable property in a base tunable data structure is changed, determining, for each instance variable of the base tunable, whether the instance variable is to inherit the changed inheritable the changed inheritable property from the base tunable, and propagating the changed inheritable property to each instance data structure corresponding to an instance variable determined to inherit the changed inheritable property.

7. A method in accordance with claim 6 further comprising deallocating at least one of the first instance of the base tunable and the second instance of the base tunable, and wherein said determination of whether the instance variable is to inherit the changed inheritable property is performed only for instance variables that are not deallocated.

8. A method in accordance with claim 1 wherein the set of inheritable properties includes at least one member of the group consisting of a name, one or more values indicative of allowed instance variable values, a description, and combinations thereof.

9. A computing apparatus including a central processing unit, a memory coupled to the central processing unit, and a memory storage device coupled to the central processing unit and upon which an operating system kernel and kernel subsystems are stored, said computing apparatus configured to:
    boot an operating system having a plurality of tunable kernel subsystems;
    store a representation of at least one base tunable having inheritable properties in the memory of the computing apparatus; and
    store, in the memory of the computing apparatus, a plurality of representations of instances of at least one said stored base tunable, each said instance including at least one inheritable property of said stored base tunable, wherein representations of at least a first said instance and a second said instance are stored at different addresses in the memory, said first instance and said second instance comprise structures including a plurality of values, and said first instance and said second instance differ in at least one corresponding said value.

10. A computing apparatus in accordance with claim 9 wherein to store a plurality of representations of instances of at least one said stored base tunable, said computing apparatus is configured to:
    from a first said kernel subsystem, call an instance creation function to store a first instance data structure in the memory of the computing apparatus corresponding to a first instance of one of said base tunables and including at least one said inheritable property, and
    from a second, different kernel subsystem, call said instance creation function to store a second instance data structure in the memory of the computing apparatus corresponding to a second instance of said one of said base tunables and including at least one said inheritable property.

11. A computing apparatus in accordance with claim 10 further configured to change at least one inheritable property in said base tunable data structure of said one of said base tunables and to propagate said changed inheritable property to both said first instance data structure and said second instance data structure.

12. A computing apparatus in accordance with claim 10 further configured to write data indicative of the identity of said one of said base tunables into said first instance data structure and said second instance data structure.

13. A computing apparatus in accordance with claim 10 further configured to determine when an inheritable property in one of said base tunables is changed, to determine, for each instance of said one of said base tunables, whether said instance variable is to inherit the changed inheritable value from said one of said base tunables, and to propagate said changed inheritable property to each instance data structure corresponding to said instance variable determined to inherit said changed inheritable property.

14. A computing apparatus in accordance with claim 13 further configured to deallocate at least one of said first instance of said base tunable and said second instance of said base tunable, and wherein said determination of whether said instance variable is to inherit said changed inheritable property is performed only for instance variables that are not deallocated.

15. A machine-readable medium or media having recorded thereon instructions that, when read by a machine, cause the same to:
   store a representation of at least one base tunable having inheritable properties in the memory of the computing apparatus; and
   store, in the memory of the computing apparatus, a plurality of representations of instances of at least one of the stored base tunable, each said instance including at least one inheritable property of the said stored base tunable, wherein representations of at least a first said instance are stored at different addresses in the memory, said first instance and said second instance comprise structures including a plurality of values, and said first instance and said second instance differ in at least one corresponding said value.

16. A machine-readable medium or media in accordance with claim 15 wherein to store a plurality of representations of instances of at least one of the stored base tunable, said medium or media has recorded thereon instructions that, when read by the machine, cause the same to:
   from a first said kernel subsystem, call an instance creation function to store a first instance data structure in the memory of the computing apparatus corresponding to a first instance of one said base tunables and including at least one said inheritable property; and
   from a second, different kernel subsystem, call said instance creation function to store a second instance data structure in the memory of the computing apparatus corresponding to a second instance of said one of said base tunables and including at least one said inheritable property.

17. A machine-readable medium or media in accordance with claim 16 and further having recorded thereon instructions that, when read by the machine, cause the same to deallocate at least one of the first instance of the base tunable and the second instance of the base tunable.

18. A machine-readable medium in accordance with claim 16 further having recorded thereon instructions that, when read by the machine, cause the same to determine when an inheritable property in a base tunable data structure is changed, and to propagate the changed inheritable property to both the first instance data structure and the second instance data structure upon said determination.

19. A machine-readable medium or media in accordance with claim 16 and further having recorded thereon instructions that, when read by the machine, cause the same to instruct the computing apparatus to determine when an inheritable property in a base tunable data structure is changed, to determine, for each instance variable of the base tunable, whether the instance variable is to inherit the changed inheritable property from the base tunable, and to propagate the changed inheritable property to each instance data structure corresponding to an instance variable determined to inherit the changed inheritable property.

20. A machine-readable medium or media in accordance with claim 19 further having recorded thereon instructions that, when read by the machine, cause the same to deallocate at least one of the first instance of the base tunable and the second instance of the base tunable, and to perform said determination and propagation only for instance variables that have not been deallocated.

* * * * *

UNITED STATES PATENT AND TRADEMARK OFFICE
CERTIFICATE OF CORRECTION

PATENT NO. : 7,191,322 B2
APPLICATION NO. : 09/977126
DATED : March 13, 2007
INVENTOR(S) : Scott T. Millward et al.

It is certified that error appears in the above-identified patent and that said Letters Patent is hereby corrected as shown below:

In column 7, line 23, delete "lunables" and insert -- tunables --, therefor.

In column 7, line 55, in Claim 3, delete "claims" and insert -- claim --, therefor.

In column 8, line 5, in Claim 6, after "inherit" delete "the changed inheritable".

In column 8, line 51, in Claim 10, delete "property," and insert -- property; --, therefor.

Signed and Sealed this

Twenty-eighth Day of October, 2008

JON W. DUDAS
*Director of the United States Patent and Trademark Office*